United States Patent
Shingai et al.

[19]

[11] Patent Number: 6,065,936
[45] Date of Patent: May 23, 2000

[54] AXIAL FAN, METHOD OF MANUFACTURING IMPELLER FOR AXIAL FAN, AND MOLD FOR MANUFACTURING IMPELLER FOR AXIAL FAN

[75] Inventors: Hiroyuki Shingai; Yukihide Umeda, both of Tokyo, Japan

[73] Assignee: Kabushiki Kaisha Copal, Tokyo, Japan

[21] Appl. No.: 09/062,644

[22] Filed: Apr. 20, 1998

[30] Foreign Application Priority Data

Apr. 25, 1997 [JP] Japan .................................... 9-109453
Apr. 6, 1998 [JP] Japan ................................... 10-093551

[51] Int. Cl.[7] .................................................. F04D 29/32
[52] U.S. Cl. ......................... 416/175; 416/132; 416/175; 416/183; 416/203; 416/201 R; 416/241 R; 416/241 A; 416/234; 416/235; 416/237; 416/223 R
[58] Field of Search ..................................... 416/132, 175, 416/183, 203, 201 R, 241 R, 241 A, 234, 235, 237, 223 R

[56] References Cited

U.S. PATENT DOCUMENTS

| | | | |
|---|---|---|---|
| 3,610,527 | 10/1971 | Ericson et al. | 239/2.2 |
| 3,885,888 | 5/1975 | Warhol | 416/175 |
| 3,915,596 | 10/1975 | Frazar | 417/423 R |
| 4,107,257 | 8/1978 | Swin, Sr. | 264/328 |
| 4,451,202 | 5/1984 | Hauser | 416/214 R |
| 4,943,209 | 7/1990 | Beehler | 416/204 |
| 5,217,351 | 6/1993 | Meier et al. | |
| 5,437,541 | 8/1995 | Vainrub | 416/223 R |

FOREIGN PATENT DOCUMENTS

| | | |
|---|---|---|
| 37-11399 | 5/1962 | Japan . |
| 56-23599 | 3/1981 | Japan . |
| 4-502052 | 4/1992 | Japan . |
| 6-264897 | 9/1994 | Japan . |
| 8-334100 | 12/1996 | Japan . |

*Primary Examiner*—Edward K. Look
*Assistant Examiner*—Matthew T. Shanley
*Attorney, Agent, or Firm*—Burns, Doane, Swecker & Mathis, LLP

[57] ABSTRACT

This invention provides a compact, flat axial fan which is not limited by the shape of an incorporated rotor magnet and ensures a sufficiently large air flow and wind pressure, wherein the slide (under) piece of a mold that forms the under-molding portions of the vanes of the impeller of the axial fan is pulled out while being twisted (while performing a helical motion) in the direction of central axis of the base portion of the impeller, so that the mold can be formed simple to realize a multi-cavity mold, and the vanes can be formed into an ideal form by setting vane angles depending on different rotating peripheral velocities of the vanes, so that air can be supplied form the under-molding portions of the vanes to the vanes on the outer circumferential side during rotation of the impeller and a method of manufacturing an impeller for the axial fan. For this purpose, in an axial fan comprising an impeller integrally formed, by resin molding, with a plurality of vanes extending from a bottomed cylindrical body to which a rotary axial support shaft body is formed at a center of rotation, each of the vanes is integrally formed by resin molding with a main vane extending from an outer circumferential surface of the bottomed cylindrical body at a predetermined tilt angle.

10 Claims, 12 Drawing Sheets

FIG. 3
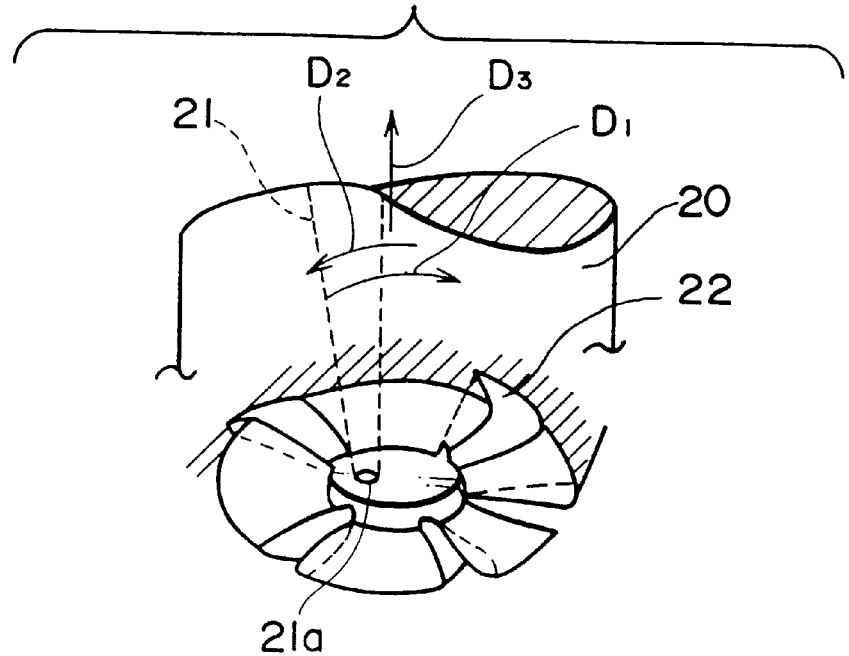
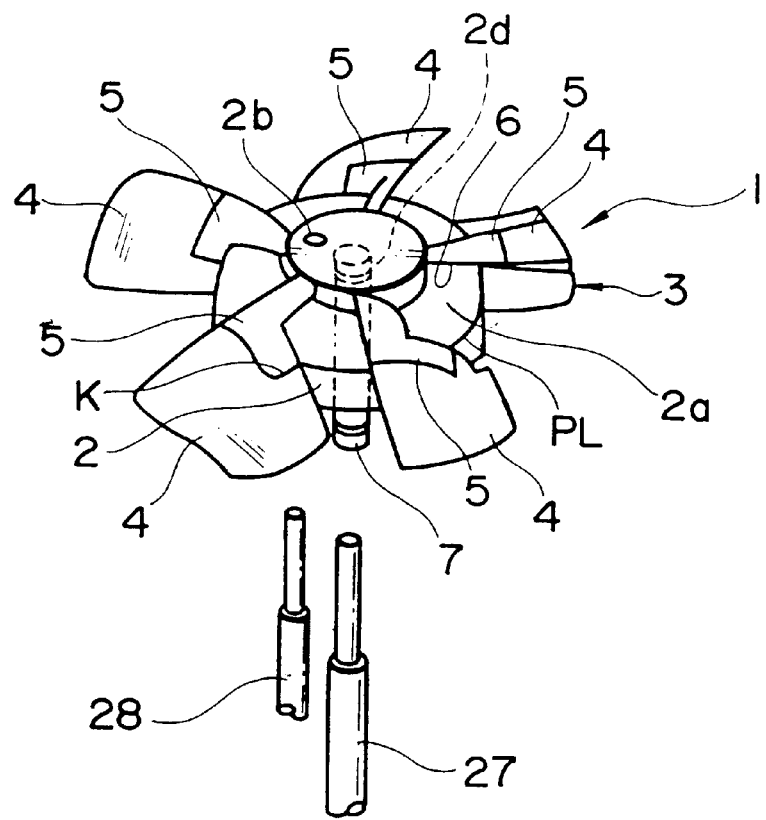

AXIAL FAN, METHOD OF MANUFACTURING IMPELLER FOR AXIAL FAN, AND MOLD FOR MANUFACTURING IMPELLER FOR AXIAL FAN

BACKGROUND OF THE INVENTION

The present invention relates to an axial fan, a method of manufacturing an impeller for the axial fan, and a mold for manufacturing the impeller of the axial fan and, more particularly, to a technology concerning an axial fan having an impeller that can obtain a sufficiently large air flow and wind pressure regardless of its compact, flat shape.

In an axial fan, an impeller, which is formed by arranging a plurality of vanes on the outer circumferential surface of a rotor having a permanent magnet on its inner circumference, is supported to be rotatable about the main body side stator of the axial fan. When a rotating magnetic field is generated in the stator, a desired air flow and wind pressure are obtained upon rotation of the rotor. Since the axial fan can be made compact and flat, it is incorporated mainly in an electronic equipment which is formed compact and flat, to prevent an increase in temperature (caused by heat generated by an internal electronic circuit board and the like.

Further downsizing and flattening of the axial fan are demanded in order to cope with recent size reduction of electronic equipments. The reduction in air flow and wind pressure upon such downsizing and flattening is not allowable. Therefore, various proposals have been made concerning an axial fan in order to ensure a large air flow and wind pressure.

"A Compact Blower" disclosed in Japanese Patent Publication No. 4-502052 is a proposal for performing downsizing and flattening while ensuring an air flow and wind pressure. According to this proposal, the vanes of an axial fan having an impeller are integrally molded so as to extend towards the central portion of the base portion of the impeller. When the axial fan is formed in this manner, a decrease in air flow caused by a decrease in outer diameter of the impeller and in area of the vanes as the result of downsizing can be prevented.

SUMMARY OF THE INVENTION

According to this proposal, the plurality of vanes formed on the outer circumferential surface of the impeller of the axial fan are continuously molded to form under portions or back side portions extending to the central portion of the base portion of the impeller. Therefore, the slide piece of the mold that forms the "under-molding portions" for the vanes must be pulled out from the central portion of the base portion of the impeller in parallel to the radial direction. As a result, the mold cannot but become complicated. Accordingly, the mold becomes very expensive.

A so-called multi-cavity mold becomes very complicated and is difficult to realize.

When the slide piece that forms the under-molding portion side for the vanes is to be pulled out from the mold in the radial (lateral) direction, the slide piece cannot be pulled out by twisting. Therefore, it is impossible to form vanes at an angle in accordance with the rotating peripheral velocity of the vanes, and the vanes cannot be formed into a form which is ideal for obtaining a desired air flow and wind pressure.

In the above proposal, a curved surface is formed on the outer circumferential surface of the base portion that forms the under-molding portions for the vanes of the impeller, so that air supplied by the under-molding portions of the vanes during rotation is supplied to the vanes on the outer circumferential side. The area of the vanes forming the under-molding portions sharply decreases at a portion closer to the central portion of the base portion. Therefore, the flow of air cannot be reliably captured by the vanes at the under-molding portions.

Since a curved surface is formed on the outer circumferential surface of the base portion of the impeller, the rotor magnet to be incorporated is limited to compact, flat one that does not interfere with the curved surface, and the structure of the stator is accordingly largely limited.

The present invention has been made in view of the problems described above, and has as its object to provide a compact, flat axial fan which is not limited by the shape of an incorporated rotor magnet and ensures a sufficiently large air flow and wind pressure, wherein the slide (under) piece of a mold that forms the under-molding portions of the vanes of the impeller of the axial fan is pulled out while being twisted (while performing a helical motion) in the direction of the central axis of the base portion of the impeller, so that the mold can be formed simple to realize a multi-cavity mold, and the vanes can be formed into an ideal form by setting vane angles depending on different rotating peripheral velocities of the vanes, so that air can be supplied from the under-molding portions of the vanes to the vanes on the outer circumferential side during rotation of the impeller, a method of manufacturing an impeller for the axial fan, and a mold for manufacturing the impeller of the axial fan.

In order to solve the above problems and to achieve the above object, according to the present invention, there is provided an axial fan comprising an impeller integrally formed, by resin molding, with a plurality of vanes extending from a bottomed cylindrical body to which a rotary axial support shaft body is formed at a center of rotation of a bottom surface, each of the vanes being constituted by a main vane extending from an outer circumferential surface of the bottomed cylindrical body at a predetermined tilt angle, and a sub-vane extending, on a substantially flat outer side surface forming the bottom surface, from the main vane toward the center of rotation continuously at the predetermined tilt angle to supply air to the main vane.

There is also provided a method of manufacturing an impeller for an axial fan having the impeller integrally formed, by resin molding, with a plurality of vanes; extending from a bottomed cylindrical body to which a rotary axial support shaft body is formed at a center of rotation of a bottom surface, comprising in order to form each of the vanes integrally by resin molding with a main vane extending from an outer circumferential surface of the bottomed cylindrical body at a predetermined tilt angle, and a sub-vane extending, on a substantially flat outer side surface forming the bottom surface, from the main vane toward the center of rotation continuously at the predetermined tilt angle to form an under-molding portion, arranging an under piece for molding the under-molding portion and for introducing a molten resin, performing gate cut after the resin is set, causing the under piece to perform a helical motion at a predetermined angular pitch in synchronism with mold opening, and retracting the under piece from the under-molding portion in a direction of mold opening, thereby obtaining at least one impeller.

There is also provided a mold for manufacturing an impeller for an axial fan having the impeller integrally formed, by resin molding, with a plurality of vanes extending from a bottomed cylindrical body to which a rotary axial support shaft body is formed at a center of rotation of a bottom surface, comprising a mold base portion driven to a mold open state and a mold closed state and arranged in a resin injection molding machine, and a plurality of mold pieces that form a cavity for forming, by integral resin molding, the vanes each comprising a main vane extending from an outer circumferential surface of the bottomed cylindrical body at a predetermined tilt angle, and a sub-vane extending, on a substantially flat outer surface that forms the bottom surface, from the main vane toward the center of rotation continuously at the predetermined tilt angle to form an under-molding portion, wherein one of the plurality of mold pieces forms an under piece which has an under shape portion for molding the under-molding portion and a runner hole portion for introducing a molten resin, which performs gate cutting after the molten resin is set, and which is helically driven at a predetermined angular pitch in synchronism with mold opening of the mold base portion, and the under piece is retracted in a mold opening direction from the under-molding portion, thereby obtaining at least one impeller.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a perspective view of the outer appearance showing the mutual relationship between the impeller 1 and a pivot piece 20 of the mold;

DETAILED DESCRIPTION OF THE PREFERRED EMBODIMENT

The preferred embodiment of the present invention will be described with reference to the accompanying drawings.

Figures 1A, 1B:
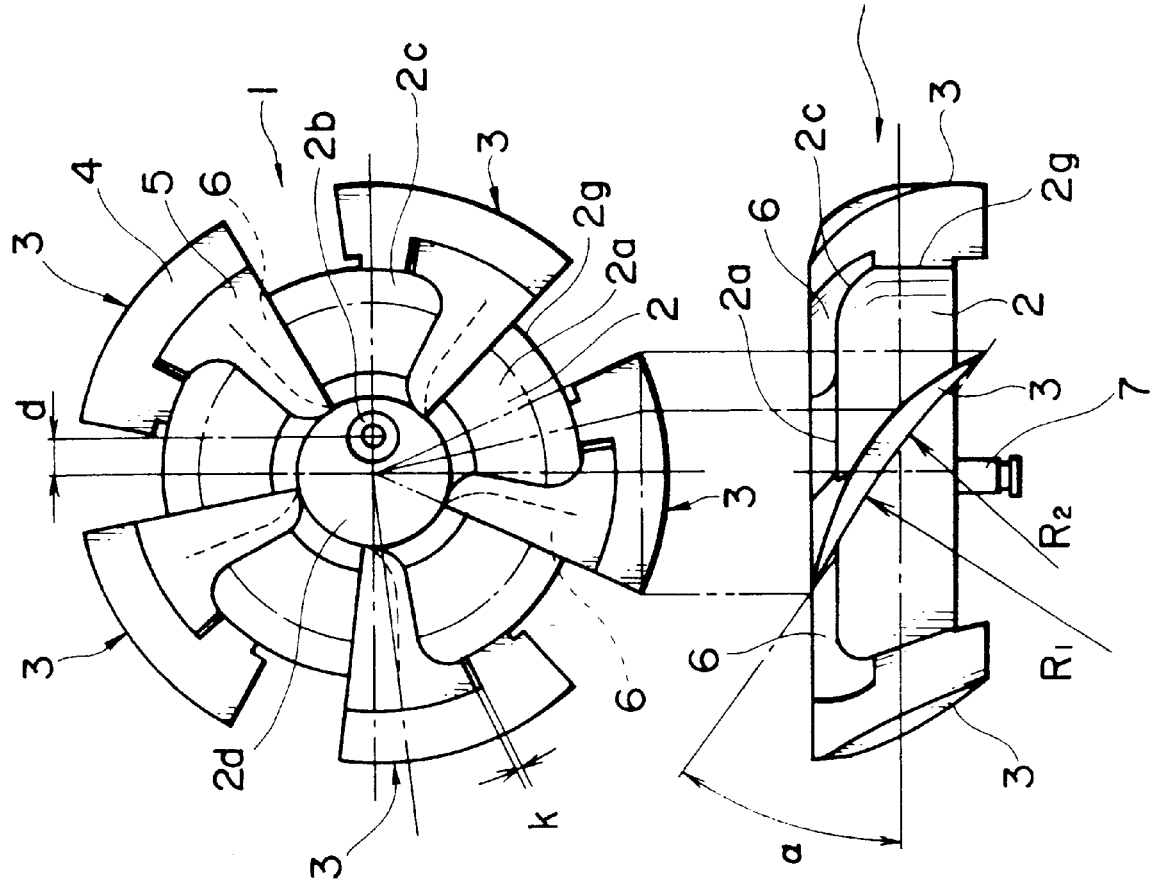
FIG. 1A is a plan view of an impeller 1.
FIG. 1B is a front view of the impeller 1.

FIGS. 1A and 1B are plan and front views, respectively, of an impeller 1 of an axial fan.

Referring to FIGS. 1A and 1B, a plurality of vanes 3, i.e., five vanes 3, having a shape as shown in FIGS. 1A and 1B are formed by monolithic resin molding equidistantly to be continuous to an outer circumferential surface 2g and a flat potion 2a of a central core portion 2. The central core portion 2 is a bottomed cylindrical body to which a shaft body 7 for rotary axial support is formed at the center of rotation of the bottom surface by insert molding, as will be described later.

Each of these vanes 3 is formed by joining a main vane 4, a sub-vane 6, and an intermediate vane 5. The main vane 4 extends from the outer circumferential surface 2g of the central core portion 2 at a predetermined tilt angle α. The sub-vane 6 extends on the outer side surface of the flat potion 2a from the main vane 4 toward the center of rotation continuously at the predetermined tilt angle α, so as to supply air to the main vane 4. The intermediate vane 5 is formed between the sub-vane 6 and the main vane 4. The intermediate vane 5 is formed as it is necessary because of the shape of the mold and is not always needed.

The sub-vane 6 supplies to the main vane 4 a wind generated by rotation in the under-molding portion indicated by a broken line in FIG. 1A. As a result, when compared to an axial fan not having sub-vanes 6, a larger air flow and wind pressure can be obtained. The edge portions serving as the corner portions of the central core portion 2 form curved surface portions 2c having a shape as shown in FIGS. 1A and 1B, so that they do not interfere with blowing. Curved surfaces having radii R1 and R2 shown in the front view of FIG. 1B are continuously formed on each vane 3, so that the vane 3 has an ideal shape.

Figure 2A:
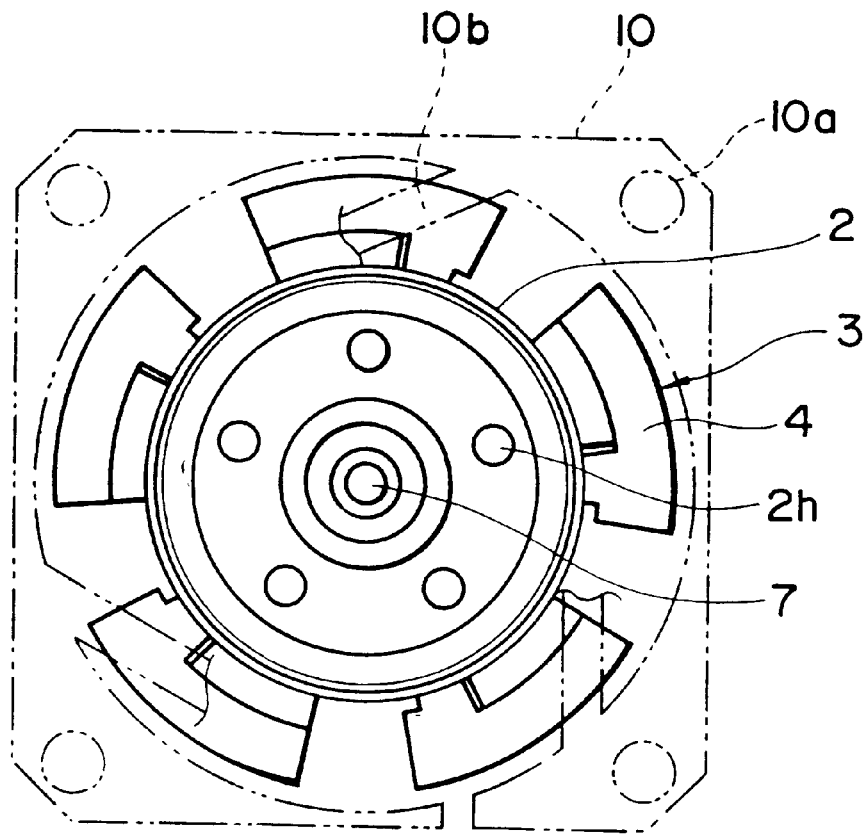
FIG. 2A is a bottom view of the impeller 1.
Figure 2B:
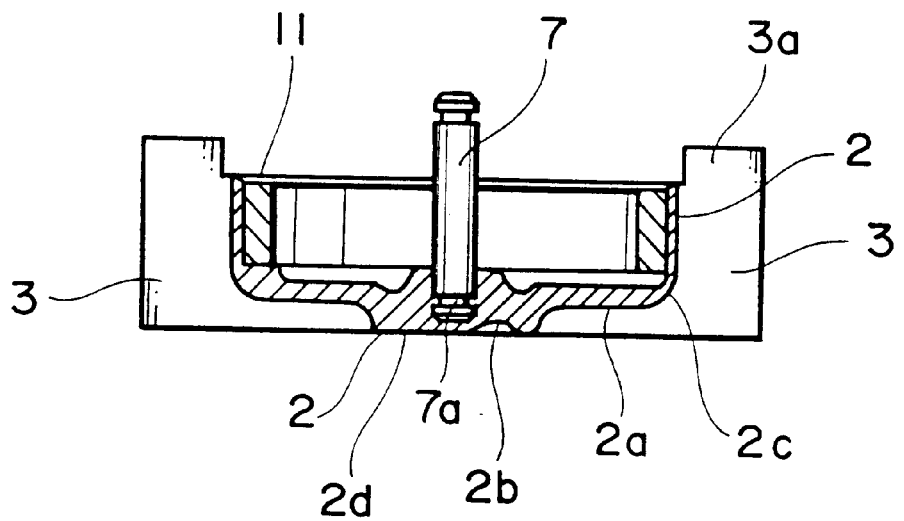
FIG. 2B is a central sectional view of the impeller 1.

Referring to the bottom view and the central sectional view of the impeller 1 of the axial fan shown in FIGS. 2A and 2B, and first, referring to FIG. 2A, the impeller 1 is rotatably arranged in a main body 10 of the axial fan indicated by a broken line. Rib portions 10b for forming a stator portion (described later) extend from the main body 10, as shown in FIG. 2A. The shaft body 7 of the impeller 1 is inserted in a bearing arranged at a portion (not shown) continuous to the rib portions 10b. Therefore, the shaft body 7 of the impeller 1 is rotatably supported.

Abutting surfaces 2h of five ejector pins for removing the molded product are equidistantly formed on the bottom surface of the central core portion 2. After molding, the pressures of the pins act uniformly, so that the product can be removed from the cavity of the mold without inclination. The product can be pulled out, together with the shaft body 7 formed by insert molding, by the pressures of the ejector pins.

Referring to FIG. 2B, each vane 3 is formed with a projecting portion 3a projecting to be higher than the entire height of the central core portion 2, as shown in FIG. 2B. Even if the central core portion 2 is formed flat, a sufficiently large vane area can be ensured.

An annular permanent magnet 11 is incorporated in the central core portion 2. As the permanent magnet 11, a cylindrical one can be used, as shown in FIG. 2B. As the shaft body 7 is formed by insert molding, a groove portion 7a is formed in it in advance to prevent accidental removal after injection molding.

A gate portion 2b serving as an introducing portion for a molten resin has a cup-like shape as shown in FIG. 2B. During gate cutting by pivot motion of a pivot piece (described later), when the pivot piece helically moves obliquely upward, the pivot piece does not interfere with the cutting operation at the gate portion 2b.

FIG. 3 is a perspective view of the outer appearance showing the relationship between the impeller 1 and a pivot piece 20 of the mold. Referring to FIG. 3, the impeller 1 is simultaneously molded with the shaft body 7 molded by insert molding, and the main vanes 4, the intermediate vanes 5, and the sub-vanes 6 are molded with a resin with a parting line PL as a boundary. Since the sub-vanes 6 form so-called under portions, the pivot piece 20 having under-molding portions 22 cannot be directly moved in the direction of an arrow $D_3$ in the mold opening direction.

For this reason, for molding, the pivot piece 20 is pivoted in the direction of an arrow $D_1$. The sub-vanes 6 as under portions are molded in the cavity. After the resin is set, the pivot piece 20 is helically moved, i.e., is moved in the direction of the arrow $D_3$ while being pivoted in the direction of an arrow $D_2$, so that the under portions can be formed. A weld line K is formed between the intermediate vane 5 and main vane 4. This weld line K is set to have a predetermined width in FIG. 1A so as not to form an under portion in the mold opening/closing direction.

The pivot piece 20 is formed with a runner hole portion 21 that forms an opening portion 21a open to the cavity. A molten resin as a predetermined mixed material containing, e.g., an ABS resin and a polybutylene terephthalate (PBT) resin, can be introduced from the gate portion 2b, which is formed in the above manner in a projecting portion 2d formed continuously from the flat potion 2a of the central core portion 2.

After gate cutting, the runner is removed from the pivot piece 20, and then the pivot piece 20 performs helical motion. One ejector pin 27 disposed at the center of a cavity C is arranged to push the insert shaft body 7, and five (only one is shown in FIG. 3) ejector pins 28 are arranged to push the central core portion 2.

Figure 4:
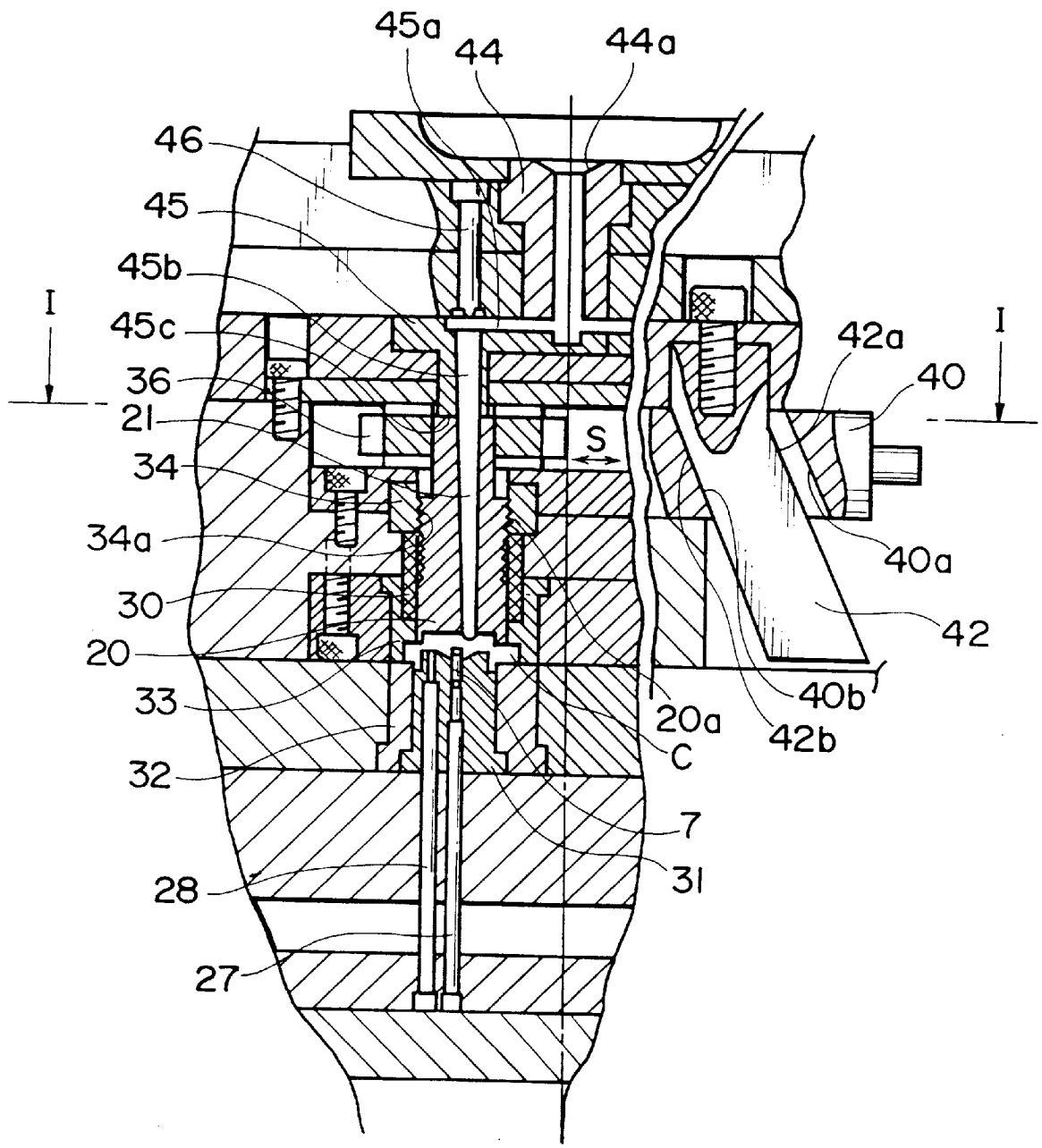
FIG. 4 is a central sectional view of a multi-cavity injection mold that forms four impellers 1 simultaneously by injection molding.
Figure 5:
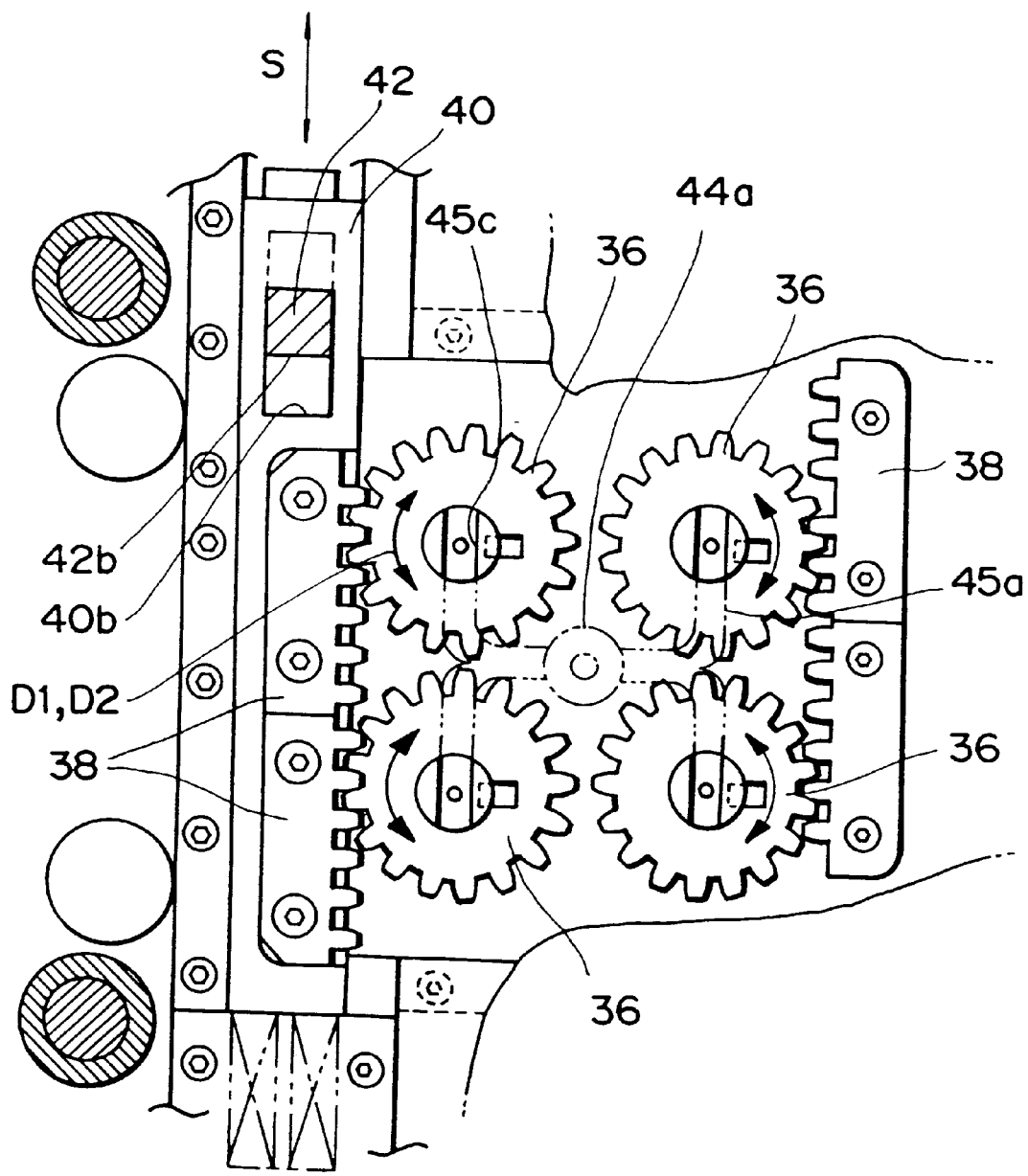
FIG. 5 is a view seen along the line I—I of FIG. 4.

FIG. 4 is a central sectional view of the multi-cavity injection mold that forms four impellers 1 simultaneously by injection molding, and shows a mold closed state. FIG. 5 is a view seen along the line I—I of FIG. 4.

Referring to FIGS. 4 and 5, portions that are already described are denoted by the same reference numerals, and a description thereof will be omitted. The shaft body 7 formed by insert molding is set in advance in the cavity C that molds the impeller 1. This cavity C is formed among a first piece 31, a second piece 32, a third piece 33, and the under-molding portions 22 of the pivot piece 20. The molten resin is introduced into this cavity C through a hole portion 44a of a sprue bush 44, a runner portion 45a of a runner member 45, and the runner hole portion 21 of the pivot piece 20, respectively, while the mold is closed.

Referring to FIG. 5, the hole portion 44a of the sprue bush 44 branches in four directions, as shown in FIG. 5, so as to form a four-cavity injection mold. However, the mold may have one cavity, and four or more cavities may be formed as required, as a matter of course.

Referring back to FIG. 4, an external thread portion 20a is formed on the outer circumferential surface of the pivot piece 20. The pivot piece 20 is set to threadably engage with a female screw piece 34 which forms an internal thread portion 34a threadably engageable with the external thread portion 20a and which is fixed to the mold. The lower portion of the pivot piece 20 is guided by a guide bush 30 to be vertically movable, while a pinion gear 36 is arranged on the upper portion of the pivot piece 20 to be vertically movable by a key 37 shown in FIG. 5 but immobile in the rotational direction.

The pinion gear 36 meshes with a rack 38 fixed to a slide piece 40. The slide piece 40 is movable to the right and left in FIG. 5 as it abuts against a tilt surface 42a or 42b of a tilt pin 42 fixed to the mold, so that it moves in the directions of a double-headed arrow S.

For this purpose, the slide piece 40 is formed with tilt surfaces 40a and 40b, as shown in FIG. 4. The components of a force generated by the mold opening operation are converted into motions in the directions of the arrow S upon abutment of the respective tilt surfaces 40a and 40b of the slide piece 40.

Groove portions 45c are formed in the joint surfaces of the runner member 45 and pivot piece 20. Hence, the pivot piece 20 is located at a predetermined pivot position in FIG. 4.

An inverted tapered pin 46 extends through a runner hole 45b of the runner member 45. The inverted tapered pin 46 enables the runner, which becomes unnecessary after molding, to be removed from the mold.

Figure 6:
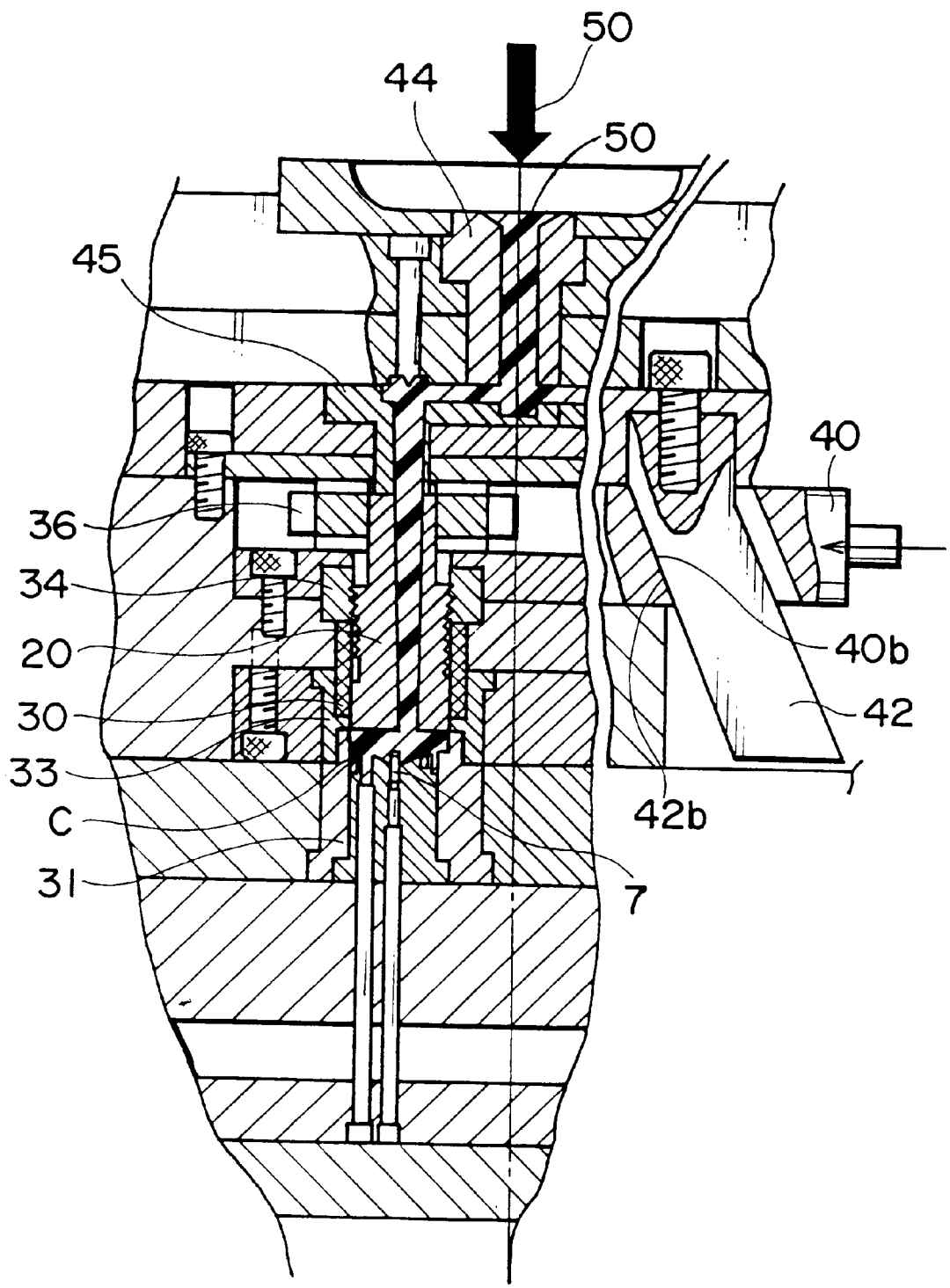
FIG. 6 is a view explaining the operation of the injection mold during mold closing.

The operation of the above arrangement will be described with reference to FIG. 6. Referring to FIG. 6, after mold closing, a molten resin 50 indicated as a solid portion is introduced into the cavity C through the hole portion 44a of the sprue bush 44, the runner portion 45a of the runner member 45, and the runner hole portion 21 of the pivot piece 20. At this time, the tilt surface 40b of the slide piece 40 abuts against the tilt surface 42b of the tilt pin 42, so that the pinion gear 36 is pivoted in the direction D2 in FIG. 3 and stopped.

Figure 7:
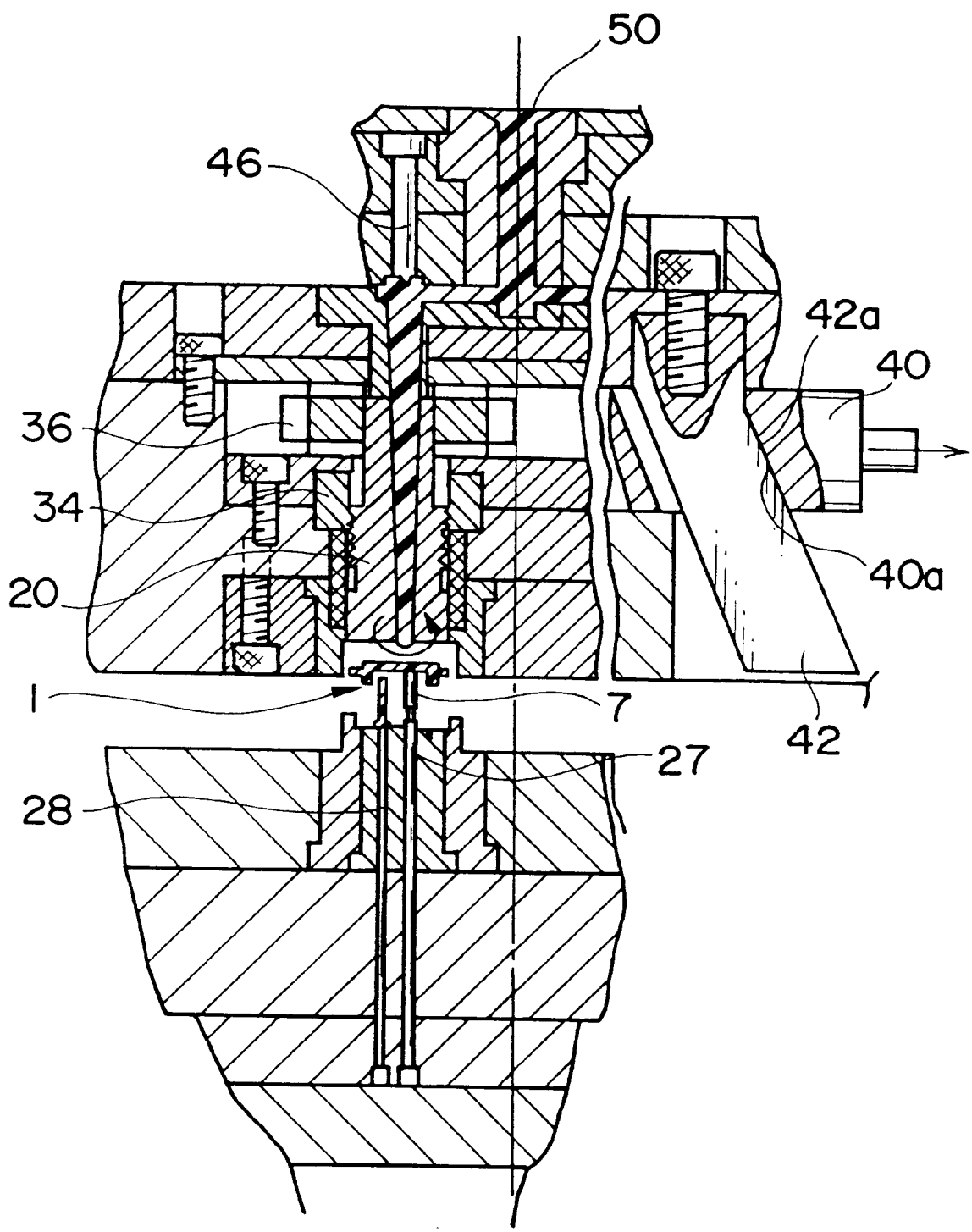
FIG. 7 is a view explaining the operation of the injection mold during mold opening.

After the introduced resin is set, the mold is opened. As shown in FIG. 7, the tilt surface 40a of the slide piece 40 abuts against the tilt surface 42a of the tilt pin 42, so that the pinion gear 36 is pivoted in the direction D1 in FIG. 3. Hence, the under portions of the sub-vanes 6 helically move so that they can be removed from the cavity C. This helical motion enables gate cutting.

In the above manner, the sub-vanes 6 continuous from the main vanes 4 at the predetermined tilt angle α in FIG. 1 are resin-molded integrally.

Thereafter, the mold is further opened, and the runner is held by the inverted tapered pin 46 so as to be removable. This operation is repeated.

Figure 8:
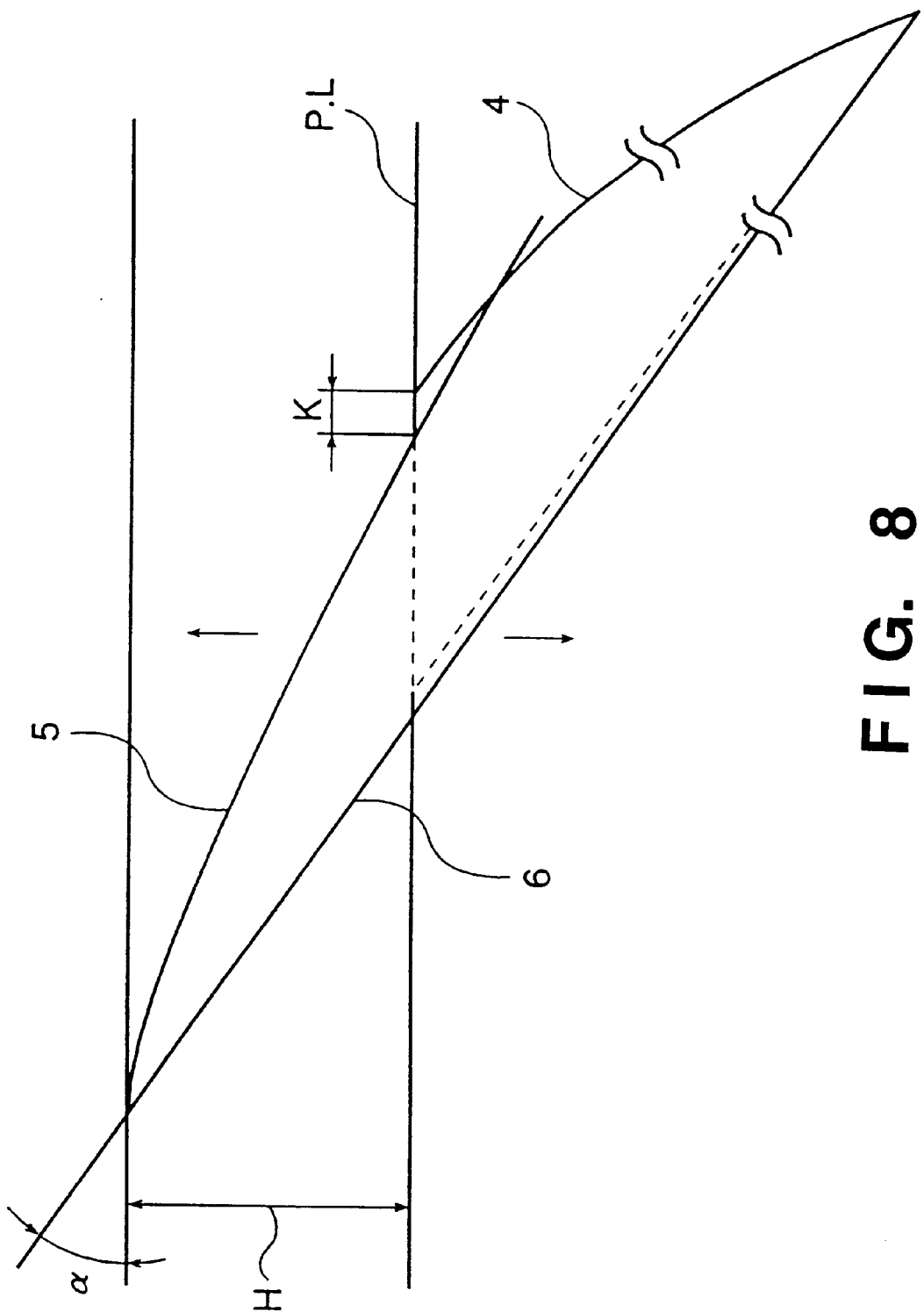
FIG. 8 is a cross-sectional view of a vane and is a developed view showing a state wherein the pivot piece 20 is rotated at a predetermined tilt angle α.

FIG. 8 shows a cross-sectional view of a vane and a developed view of a state wherein the pivot piece 20 is rotated at the predetermined tilt angle or lead angle α. Referring to FIG. 8, portions that are already described are denoted by the same reference numerals, and a description thereof will be omitted. The sub-vane 6 as the under portion, the intermediate vane 5, and the main vane 4 are molded to form the weld line K and parting line PL. A portion which does not form an under portion when the pivot piece 20 pivots and which is within the range of the predetermined tilt angle α can be molded.

In the above manner, the twist angle of the vanes can be set constant so that the pivot piece can be removed after the under portion of the sub-vane is molded. The air discharge quantities in the axial direction at the outer and inner circumferential portions of the vanes are made equal although the peripheral velocities of these portions are different from each other, thereby obtaining high efficiency depending on the different peripheral velocities. Since one end of each vane can be extended to the central portion of the boss, the vane area can be increased, the air flow at the central portion can be captured, and the lower portions of the central portions of the vanes can be removed by twisting the mold. Thus, the twist angle of the vanes can 3e changed depending on the different peripheral velocities of the vanes, thereby increasing the air supply efficiency and the air flow. As described above, when the vanes of the fan motor are extended to the central portion, the vane area can be increased. Since the central portions of the vanes can be removed by twisting the mold, the vanes at the removing portions of the central portion can be twisted. Since the vanes at the removing portions of the central portion are connected to their twisted portions that are obtained by vertical division, the vanes can be twisted such that the twisting angle on the outer circumferential side is decreased depending on the peripheral velocities of the vanes. As a result, the air supply efficiency is increased, and the air flow is increased.

Figure 9:
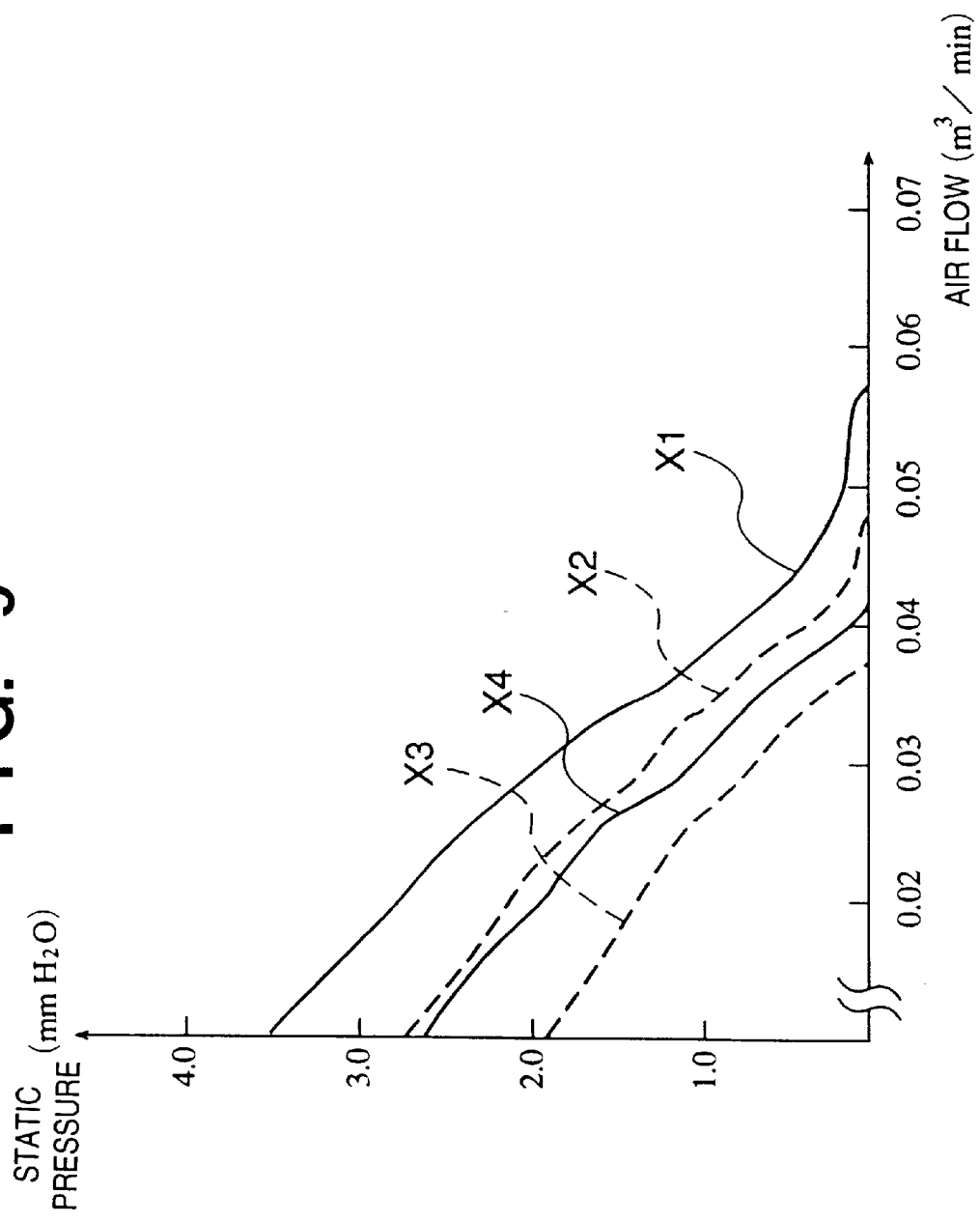
FIG. 9 is a graph of comparative measurement of an axial fan having sub-vanes and an axial fan not having sub-vanes.

FIG. 9 is a graph of comparative measurement of an axial fan having sub-vanes and an axial fan not having sub-vanes. A characteristic curve X1 indicated by a solid one shows the air flow and wind pressure at 9,000 rpm which are obtained when the impeller 1 having the sub-vanes described above is attached to a very compact axial fan with a 25-mm square, 10-mm thick outer shape. A characteristic curve X2 indicated by a broken line shows the air flow and wind pressure at 9,000 rpm which are obtained when the impeller has no sub-vanes. It is confirmed that, when the sub-vanes 6 are formed, the air flow and wind pressure can be greatly increased, as indicated by the curves of FIG. 9.

Similarly, a characteristic curve X4 indicated by another solid line shows the air flow and wind pressure at 8,000 rpm which are obtained when the impeller has the sub-vanes described above, and a characteristic curve X3 indicated by another broken line shows the air flow and wind pressure at 8,000 rpm which are obtained when the impeller has no sub-vanes as described above. It is confirmed that, when the sub-vanes 6 are formed, the air flow and wind pressure can be greatly increased, as shown in FIG. 9.

As has been described above, according to the present invention, there is provided a compact, flat axial fan which is not limited by the shape of an incorporated rotor magnet and ensures a sufficiently large air flow and wind pressure, wherein the slide (under) piece of a mold that forms the under-molding portions of the vanes of the impeller of the axial fan is pulled out while being twisted (while performing a helical motion) in the direction of central axis of the base portion of the impeller, so that the mold can be formed simple to realize a multi-cavity mold, and the vanes can be formed into an ideal form by setting vane angles depending on different rotating peripheral velocities of the vanes, so that air can be supplied from the under-molding portions of the vanes to the vanes on the outer circumferential side during rotation of the impeller, a method of manufacturing an impeller for the axial fan, and a mold for manufacturing the impeller of the axial fan.

Figure 10:
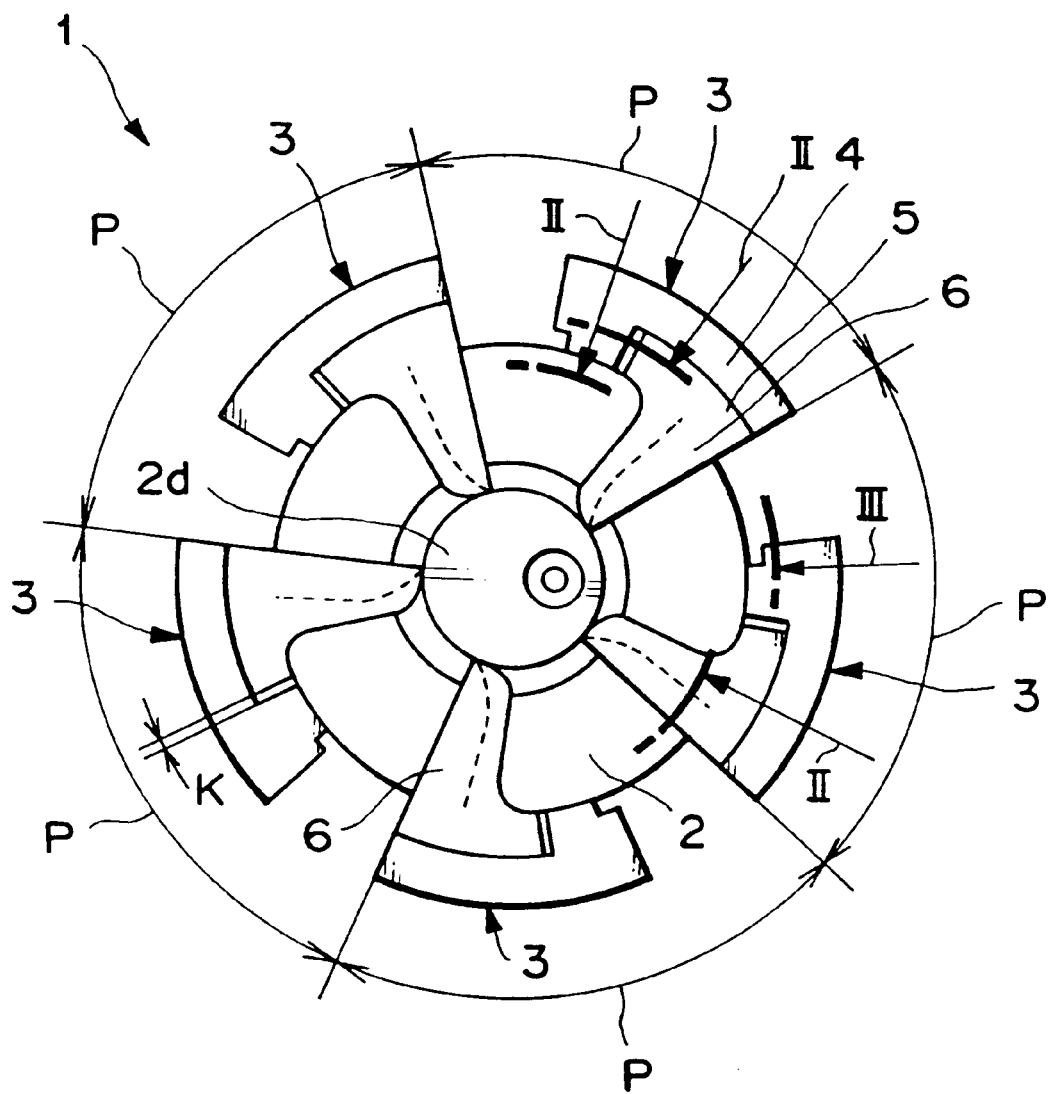
FIG. 10 is a plan view of an impeller 1 of an axial fan.

The process of molding sub-vanes 6 serving as the under-molding portions will be described with reference to the plan view of an impeller 1 of the axial fan ir. FIG. 10, the sectional view showing the developed state of the helical motion of a pivot piece 20 along the line II—II in FIG. 10, and the developed view (FIG. 11) illustrated together with the sectional view along the line III—III in FIG. 10 so as to show the vertical motions of second and third pieces 32 and 33. A plurality of vanes (five vanes in this case) 3 are integrally molded at an equal angular pitch P of 72°, as shown in FIG. 10. For this monolithic molding, the pivot piece 20 having molding portions for molding under-molding portions 20a and outer portions 20b of the sub-vanes 6 waits until the molten resin is set upon its injection. The pivot piece 20 helically moves in the direction of an arrow by a distance L2, the upward direction by a distance L3, and the direction of a broken line by a distance L4 during mold opening.

The pivot piece 20 has helically moved along the circumferential direction by a lead angle β corresponding to the distance L2. On the other hand, during mold opening, the second pieces 32 move downward, while the third pieces 33 move upward in FIG. 10, so that the molded impeller can be moved outside the mold.

In the above construction and operation, the plurality of vanes (five vanes in this case) 3 are integrally molded at the equal angular pitch P of 72°, as shown in FIG. 10. Since the number of vanes 3 is five, a sufficient distance is ensured between the adjacent vanes 3. Even if the pivot piece 20 moves the distance L2, it can helically move at the lead angle β without interfering with the adjacent vanes 3.

Figure 11:
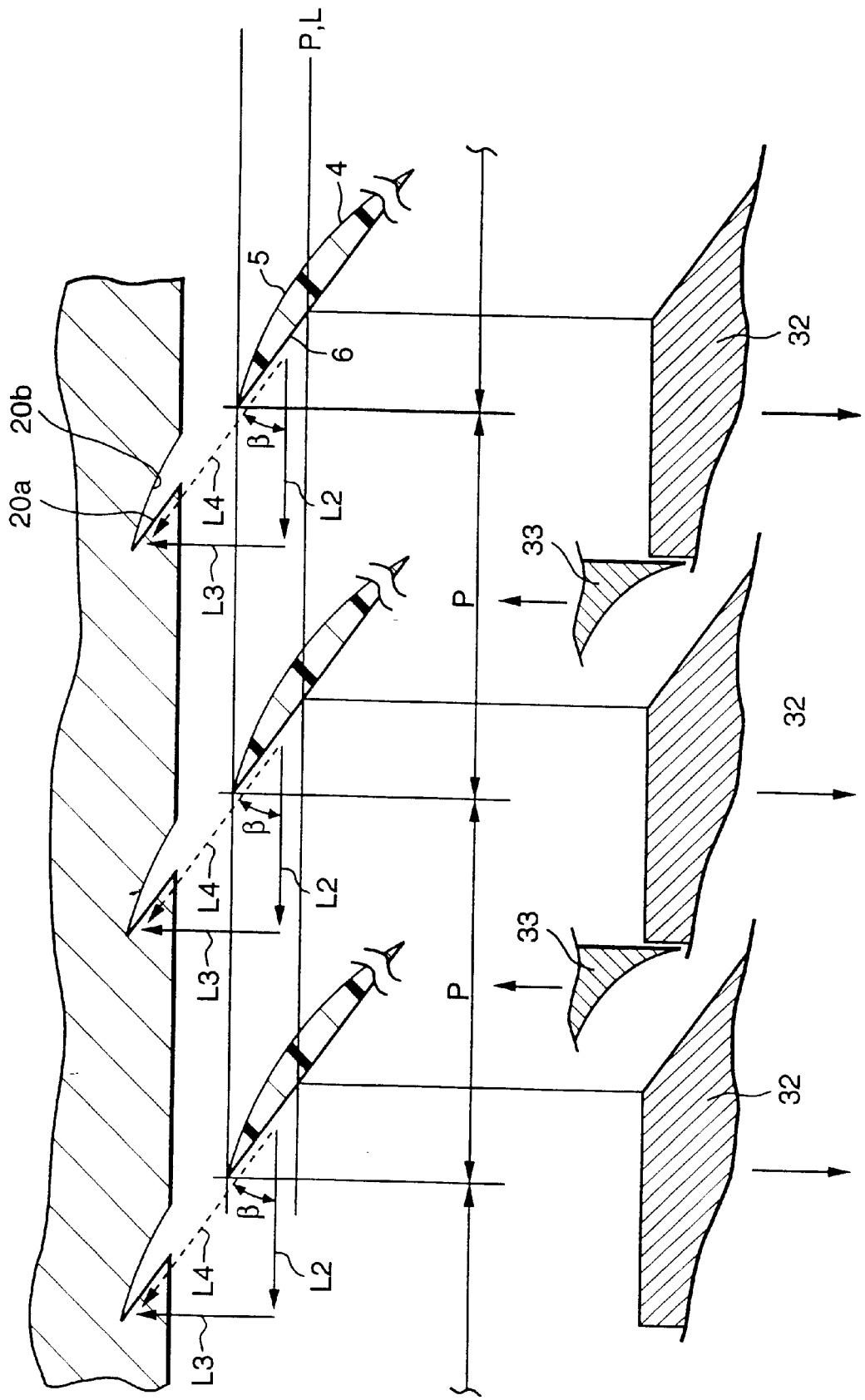
FIG. 11 shows a sectional view taken along the line II—II in FIG. 10 in order to illustrate the helical motion of a pivot piece 20 in a developed manner, and a developed view together with the sectional view taken along the line III—III in FIG. 10 in order to illustrate vertical motions of second and third pieces 32 and 33.
Figure 12:
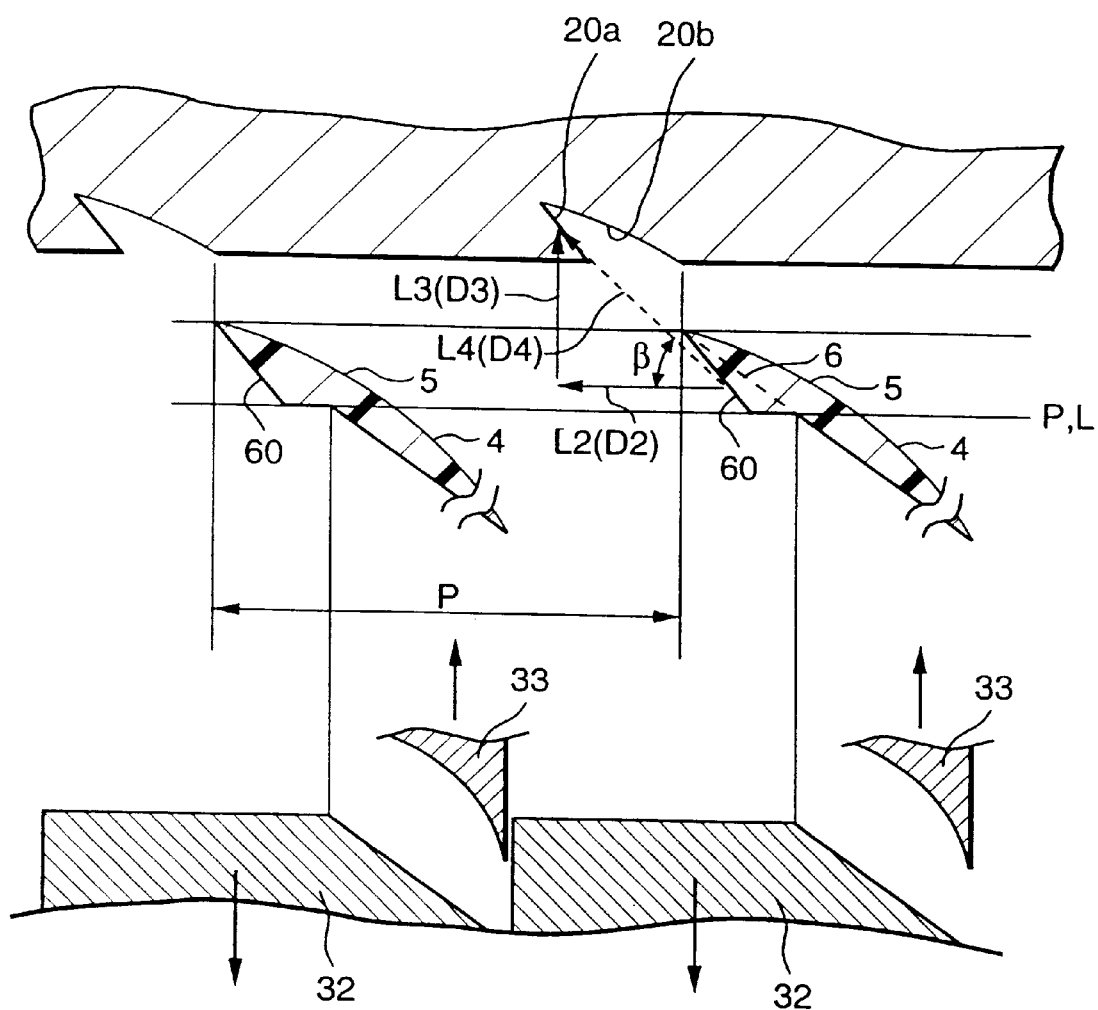
FIG. 12 is a developed view of the helical motion of a pivot piece in order to form shape portions 60.

As in FIG. 11, FIG. 12 is a developed view showing a case in which a pitch P of vanes 3 is reduced to form a larger number of vanes 3. Referring to FIG. 12, a pivot piece 20 for forming the under-molding portions of sub-vanes 6 waits until the molten resin is set upon its injection. The pivot piece then moves in the direction of an arrow by a distance L2 during mold opening. As described with reference to FIG. 11, when the sub-vanes 6 serving as the under-molding portions are molded without any consideration, the pivot piece 20 interferes with the adjacent vanes. The pivot piece 20 cannot be removed by the helical motion.

Shape portions 60 each having an angle β larger than the predetermined tilt angle α are formed in place of the sub-vanes 6, respectively, while under-molding portions 20a and outer portions 20b are formed in the pivot piece 20 for molding shape portions 60. The pivot piece 20 can helically move at a lead angle β when it moves in the direction of an arrow D3 by a distance L3 and the direction of an arrow D2 by a distance L2, thereby preventing the pivot piece 20 from interfering with the adjacent vanes. During mold opening, second pieces 32 move downward, while third pieces 33 move upward, so that the molded impeller can be removed outside the mold.

By forming shape portions 60 as described above, distnace L2 can be made smaller and opening portion between under-molding portions 20a and outer portions 20b are made wider, thus facilitating movement of the pivot piece 20 after molding.

Accordingly, design freedom of a shape, number or location of vanes with respect to central core portion can be maintained, which realizes various types of impeller. For example, number of vanes can be increased or an area of vanes can be widened or vanes can be made much twisted shape. These combination or selection realizes a freedom in impeller mold designing.

Furthermore, by providing the shape portions 60, a thickness of vane is increased, thus increasing the mechanical strength of vanes, in addition allowing the flow of more space for molten resin materials having higher viscosity becomes possible, which realizes wider selection of resigns for variety of impellers.

Note that the under-molding portions having a tilt angle equal to the tilt angle α cannot be obtained in the molded body in FIG. 12, but the wind volume can be similarly increased by the wind generated by the shape portions 60.

As many apparently widely different embodiments of the present invention can be made without departing from the spirit and scope thereof, it is to be understood that the invention is not limited to the specific embodiments thereof except as defined in the appended claims.

What is claimed is:

1. An axial fan comprising an impeller integrally formed, by resin molding, with a plurality of vanes extending from a bottomed cylindrical body to which a rotary axial support shaft body is formed at a center of rotation, each of said vanes being integrally formed by resin molding with a main vane extending from an outer circumferential surface of said bottomed cylindrical body at a predetermined tilt angle, and a sub-vane extending, on a substantially flat outer circular surface of said bottomed cylindrical body, from said main vane toward said center of rotation continuously at the predetermined tilt angle to supply air to said main vane.

2. The axial fan according to claim 1, further comprising a shape portion integrally molded with said sub-vane at a tilt angle larger than the predetermined tilt angle and formed on said substantially flat outer circular surface of said bottomed cylindrical body.

3. The axial fan according to claim 1, wherein said shaft body is formed by insert molding at said center of rotation of said bottomed cylindrical body.

4. The axial fan according to claim 1, wherein a curved surface portion is further formed on a corner portion of said bottomed cylindrical body which is continuous to said outer circular surface.

5. The axial fan according to claim 1, wherein said plurality of vanes are equidistantly formed by integral resin molding.

6. The axial fan according to claim 1, wherein said main vane is formed with an extending portion that extends by a height not less than a height of said bottomed cylindrical body.

7. A method of manufacturing an impeller for an axial fan having said impeller integrally formed, by resin molding, with a plurality of vanes extending from a bottomed cylindrical body to which a rotary axial support shaft body is formed at a center of rotation, comprising, in order to form each of said vanes integrally by resin molding with a main vane extending on a substantially flat outer circular surface of said bottomed cylindrical body at a predetermined tilt angle, and a sub-vane extending, on a substantially flat outer side surface forming a bottom surface of said bottomed cylindrical body, from said main vane toward said center of rotation continuously at the predetermined tilt angle to form an under-molding portion, arranging an under piece for molding said under-molding portion and for introducing a molten resin, and helically moving said under piece at a predetermined lead angle after gate cutting to retract said under piece from said under-molding portion in a direction of mold opening, thereby obtaining at least one impeller.

8. The method according to claim 7, further comprising forming a shape portion, integrally molded with said sub-vane at a tilt angle larger than the predetermined tilt angle, on said substantially flat outer circular surface of said bottomed cylindrical body.

9. The method according to claim 7, wherein said shaft body is formed by insert molding at said center of rotation of said bottomed cylindrical body.

10. The method according to claim 7, wherein a gate portion is displaced from said center of rotation, and is formed into a shape not to interfere with gate cutting.

\* \* \* \* \*